(12) United States Patent
Lazarz et al.

(10) Patent No.: US 8,440,264 B2
(45) Date of Patent: May 14, 2013

(54) METHOD FOR PREPARING A BRAZED SURFACE FOR RECEIVING A COATING

(75) Inventors: Kimberly Lazarz, Ypsilanti, MI (US); Timothy V. Evans, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1421 days.

(21) Appl. No.: 11/611,249

(22) Filed: Dec. 15, 2006

(65) Prior Publication Data

US 2008/0145542 A1  Jun. 19, 2008

(51) Int. Cl.
*B05D 3/00* (2006.01)

(52) U.S. Cl.
USPC ........ 427/310; 228/148; 228/262.9; 228/201; 134/22.16; 134/22.17; 134/42

(58) Field of Classification Search .................. 427/310; 228/148, 201, 262.9; 134/22.16, 22.17, 42
See application file for complete search history.

(56) References Cited

U.S. PATENT DOCUMENTS

| 3,074,824 | A | * | 1/1963 | Binger et al. | 134/28 |
| 4,335,677 | A | * | 6/1982 | Nagata et al. | 118/306 |
| 4,619,716 | A | * | 10/1986 | Suzuki et al. | 148/26 |
| 6,187,308 | B1 | | 2/2001 | Hildreth | |
| 6,432,899 | B1 | * | 8/2002 | Sjostrom | 510/245 |
| 6,475,301 | B1 | * | 11/2002 | Grab et al. | 148/272 |
| 6,659,171 | B2 | | 12/2003 | Inbe et al. | |
| 6,840,051 | B1 | | 1/2005 | Stein | |
| 6,899,166 | B2 | | 5/2005 | Kuno et al. | |
| 6,991,532 | B2 | | 1/2006 | Goldsmith | |
| 2005/0167005 | A1 | * | 8/2005 | Barnard et al. | 148/275 |
| 2009/0050239 | A1 | * | 2/2009 | Honda et al. | 148/24 |

* cited by examiner

*Primary Examiner* — Timothy Meeks
*Assistant Examiner* — Nathan T Leong
(74) *Attorney, Agent, or Firm* — Damian Porcari; Brooks Kushman P.C.

(57) ABSTRACT

According to one embodiment of the present invention, a method for preparing a brazed surface to receive a coating is disclosed. The method includes providing a brazed surface having a flux layer including a conversion coating and a powder component; and applying an aqueous solution containing a flux-removing agent to the surface to at least partially remove the powder component of the flux layer to obtain a treated brazed surface that is suitable for receiving a subsequent coating layer.

15 Claims, 2 Drawing Sheets

METHOD FOR PREPARING A BRAZED SURFACE FOR RECEIVING A COATING

BACKGROUND OF THE INVENTION

1. Field of the Invention

One aspect of the present invention relates to a method for preparing a brazed surface for receiving a coating.

2. Background Art

Aluminum heat exchangers are commonly utilized in vehicle HVAC systems, for example, radiators, condensers and evaporators. After assembly of the components (e.g. fins, tubes and headers) of the heat exchanger, flux is applied to the surface of the heat exchanger. The flux can be an aluminum potassium fluoride based composition, for example, NOCOLOK(R) Flux, available from Solvay Fluorides, LLC. The unit is then typically brazed in a controlled atmosphere furnace. The flux is utilized to inhibit the growth of an undesirable oxide layer and/or to promote wetting of the liquid metal as it passes through the brazing furnace.

Typically, there is no effort to remove the flux after the brazing operation. Therefore, the flux remains on the surface of the heat exchanger. During the brazing operation, the flux layer is formed. The flux layer includes a conversion coating, which is a coating that is chemically bonded to the brazing surface. The flux also leaves behind a powder substance on the brazing surface. The powder substance, which is similar to a light layer of talc coated onto the surface of the heat exchanger, inhibits effective wetting of the surface and further coating of the surface. Since the powder itself delaminates from the heat exchanger surface over time, a coating over this powder layer is not effective, and becomes easily delaminated.

Post-brazing coatings can serve one or more purposes. One or more coatings can provide odor prevention, watershed, and/or anti-corrosion features.

Several proposals have been advanced to adhere a coating to the flux layer with unsatisfactory results. Coating methods have included application of a conversion coating applied by dip or spray applications. Further, paint-type coating methods have been proposed.

In light of these unsatisfactory results, methods have been proposed for removing the powder component of the flux layer after brazing so that the surface can be effectively coated. Several attempts have been made to use acid etching techniques to remove the flux layer. Non-limiting examples of acids used in accordance with these techniques include hydrofluoric, nitric, hydrochloric and phosphoric acids. Moreover, base etching techniques have been utilized with potassium hydroxide and sodium hydroxide. These methods have not effectively removed the flux layer such that the surface is suitable for application of subsequent coating layers.

In light of the foregoing, what is needed is a method and composition for removing at least a portion of the powder component of the flux layer from a surface such that the surface is suitable for receiving a subsequent coating without substantial delamination.

SUMMARY OF THE INVENTION

According to a first embodiment of the present invention, a method for preparing a brazed surface to receive a coating is disclosed. The method includes providing a brazed surface having a flux layer comprised of a conversion coating and/or a powder component; and applying an aqueous solution containing a flux-removing agent to the surface to at least partially remove the powder component of the flux layer to obtain a treated brazed surface that is suitable for receiving a subsequent coating layer. The flux-removing agent can be potassium fluoride (KF). The concentration of KF can be in the range of 2.5% to 3.5% by weight of the aqueous solution. In at least one embodiment, the concentration of KF can be 3.0% by weight of the aqueous solution. The applying step can include immersing the brazed surface in the aqueous solution for a period of 30 to 180 seconds and subsequently removing the surface from immersion. In at least one embodiment, the powder component is essentially entirely removed from the brazed surface.

In at least one embodiment, the providing step can include applying a flux to an unbrazed surface; and brazing the unbrazed surface to obtain the brazed surface and the flux layer. The flux can be a NOCOLOK(R) flux. The method can further include directly applying the subsequent coating layer to the treated brazed surface without any intervening steps between applying the flux-removing agent and directly applying the subsequent coating layer. The coating can be an odor prevention coating or an anti-corrosion coating. The directly applying step can include spraying the coating onto the treated surface. The brazed surface can be a brazed surface on a heat exchanger.

According to a second embodiment of the present invention, a method for preparing a brazed surface to receive a coating is disclosed. The method includes providing a brazed surface having a flux layer comprised of a conversion coating and a powder component; and immersing the brazed surface in an aqueous solution of potassium fluoride (KF) at a concentration of 2.5%-3.5% by weight of the aqueous solution for a period of 30 to 180 seconds and subsequently removing the brazed surface from immersion to at least partially remove the powder component of the flux layer and to obtain a treated brazed surface that is suitable for receiving a subsequent coating layer. The method can further include applying the subsequent coating layer to the treated brazed surface so that the coating adheres to the treated brazed surface. In at least one embodiment, the immersion time is 60 seconds. The providing step can include applying a flux to an unbrazed surface; and brazing the unbrazed surface to obtain the brazed surface and the flux layer. The flux can be a NOCOLOK(R) flux.

According to a third embodiment of the present invention, a method for preparing a brazed surface to receive a coating is disclosed. The method includes providing an aluminum part having one or more aluminum surfaces; applying a flux to the one or more aluminum surfaces; brazing the one or more aluminum surfaces to obtain one or more brazed surfaces and a flux layer comprised of a conversion coating and a powder component; and immersing the one or more brazed surfaces in an aqueous solution of potassium fluoride (KF) at a concentration of 2.5%-3.5% by weight of the aqueous solution for a period of 30 to 180 seconds and subsequently removing the one or more brazed surfaces from immersion to at least partially remove the powder component of the flux layer and to obtain one or more treated brazed surface that are suitable for receiving a subsequent coating layer. The method can further include applying the subsequent coating layer to the treated brazed surface so that the coating adheres to the treated brazed surface. The subsequent coating can be an odor preventing coating layer.

DETAILED DESCRIPTION OF EMBODIMENTS OF THE PRESENT INVENTION

Figure 1:
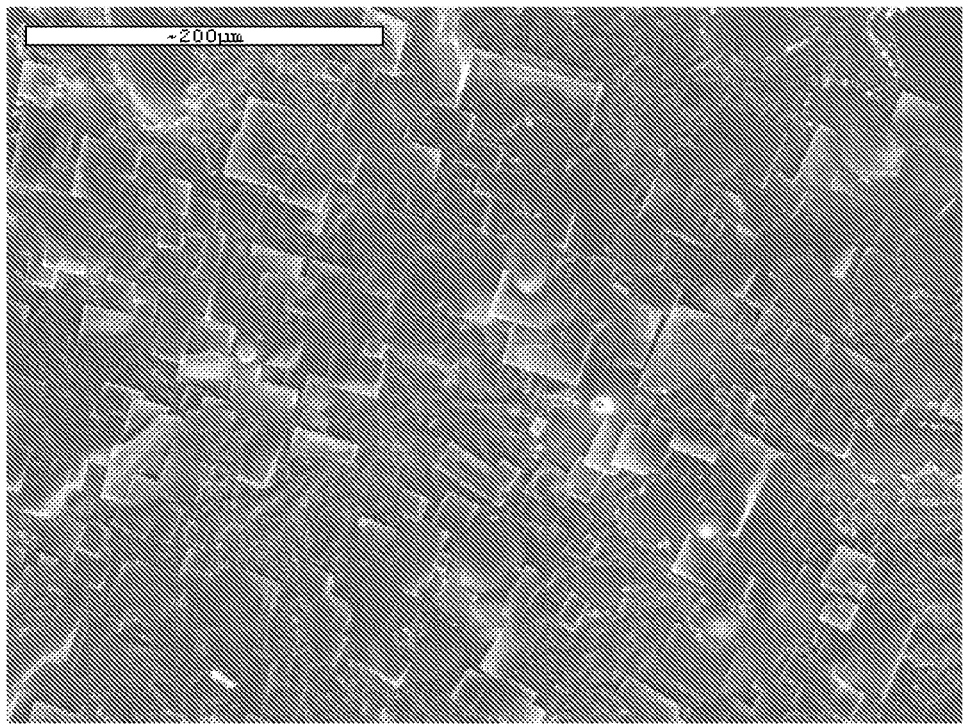
FIG. 1 depicts a scanning electron microscopy (SEM) image of a surface of an aluminum manifold after fluxing and brazing according to one embodiment of the present invention.

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a single material, compound or constituent or a group or class of materials, compounds or constituents as suitable for a given purpose in connection with the present invention implies that mixtures of any two or more single materials, compounds or constituents and/or groups or classes of materials, compounds or constituents are also suitable. Also, unless expressly stated to the contrary, percent, "parts of," and ratio values are by weight. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

A method for preparing one or more brazed surfaces to receive a subsequent coating layer is disclosed according to one embodiment of the present invention.

The one or more surfaces can be one or more surfaces on a heat exchanger used in vehicle HVAC systems, for example, radiators, condensers and evaporators. It should be appreciated that other components and part surfaces can be prepared for receiving a subsequent coating layer according to one or more embodiments of the present invention.

The heat exchanger or other suitable component or part can be constructed of an aluminum material. Non-limiting examples of aluminum materials include alloys containing mostly aluminum and at least one of such metal as silicon, copper, manganese, zinc, titanium, iron, chromium, zirconium, magnesium, etc. Specific non-limiting examples thereof include aluminum alloy materials such as Aluminum Association 1XXX, 3XXX, 4XXX, 5XXX, and 6XXX series aluminum alloys. In at least one embodiment, the aluminum for applications of making heat exchangers would be either pure aluminum or an aluminum alloy such as 3003 or 3003 clad with 4045, 4047, or 4343.

Referring to embodiments relating to heat exchangers, after assembly of the heat exchanger components and before brazing, a flux can be applied to the surface of the heat exchanger. The flux disrupts formation of an undesirable oxide layer during brazing and promotes wetting of the liquid brazing metal. A non-limiting example of a flux material is NOCOLOK(R) flux, available from Solvay Fluorides, LLC. One form of NOCOLOK(R) flux is an aqueous suspension of $KAlF_4 + K_3AlF_6$ solution which can sprayed onto the heat exchanger components, and after drying, the heat exchanger components can be brazed in a controlled atmosphere furnace. In at least one embodiment, the heat exchanger components can be dipped into the aqueous suspension of NOCOLOK(R) flux. Typical fluxes melt at 565-575° C. and react with the surface aluminum oxide, causing the surface to be both dissolved and simultaneously protected from further oxidation, as it reaches braze temperature between 585-600° C.

In at least one embodiment, the aluminum surface can be degreased before the brazing operation. Non-limiting examples of degreasing techniques include thermal degreasing with evaporative oils, aqueous alkaline degreasing, with, for example, or alkaline solutions of potassium hydroxide or sodium hydroxide. The particular thermal degreasing or aqueous alkaline surface degreasing treatment step can vary in material, time, and temperature as long the result it that the surface is degreased. The use of an alkaline solution is preferred in at least one embodiment. One useful example of a mild alkaline solution for degreasing is 1% KOH solution (pH 11.0), like 1% Betz Kleen 180 solution, which is allowed to clean the aluminum surface for 45 seconds at 140° F. After exposure to the cleaner, the treated surface is usually rinsed.

After the brazing operation, the aluminum surfaces include a flux layer, which is comprised of a conversion coating and a powder component. The powder component inhibits the aluminum surfaces from effectively receiving a subsequent coating layer.

In at least one embodiment, the present invention recognizes that an aqueous solution containing a flux-removing agent can be applied to the aluminum surfaces to at least partially remove the powder component of 1% flux layer to obtain a treated brazed surface that is suitable for receiving a subsequent coating layer. In at least one embodiment, the powder component of the flux layer is essentially entirely removed or completely removed. The flux-removing agent can be potassium fluoride (KF).

In at least one embodiment, the brazed aluminum surfaces are contacted by an aqueous KF bath by immersion therein to remove the flux layer. In at least one embodiment, the concentration of the KF by weight of aqueous solution is 2.5% to 3.5%, and in at least one embodiment, 3.0%. In at least one embodiment, the aqueous KF solution is at a temperature of 90° F., 120° F., or 130° F. to 150° F., 170° F., or 212° F. The brazed aluminum surfaces are contacted by the aqueous KF bath for 30, 60, 90, 120, or 150 seconds to 180, 210, 240, 270 or 300 seconds to remove at least a portion of the powder component of the flux layer such that the aluminum surfaces are suitable for receiving a coating layer. It should be appreciated that the KF concentration, the aqueous KF solution temperature, and immersion time can be varied based on the aluminum material utilized, the geometry of the aluminum surfaces, and other parameters.

Once the flux layer is effectively removed, a subsequent coating layer can be effectively applied to the brazed aluminum surfaces. In at least one embodiment, the subsequent coating is applied directly to the KF treated aluminum surface without the application of any other coating or adhesive to prime the KF treated aluminum surface before subsequent coating application. In other words, the KF treatment of the brazed aluminum surface provides a native surface that is suitable to receive a subsequent coating layer without any intervening steps. Non-limiting examples of coating application methods includes dip coating, immersion coating and spray coating.

It has been found that better adhesion to the aluminum surfaces can be achieved by removing the powder component of the flux layer. Conversion coatings, which require contact between the reacting chemicals and the aluminum substrate, can be used after flux layer removal. Without flux layer removal, these conversion coatings cannot be applied because the presence of flux prevents the requisite contact between the reacting chemicals and the aluminum substrate.

In at least one embodiment, the coating is a deodorizing, anti-microbial and/or hydrophobic coating that inhibits the growth of bacteria, yeast and/or fungus. If these microorganisms are allowed to grow within the heat exchanger unit, then an odor can be emitted into the vehicle interior cabin during use of the HVAC systems. The coating can be a polyaniline film for decomposing microorganisms contained within condensed water adhering to the surface of the heat exchanger, as disclosed in U.S. Pat. No. 6,899,166, hereby incorporated by reference. Another coating example is a hydrophilic modification coating for odor and rust prevention, as disclosed in U.S. Pat. No. 6,659,171, hereby incorporated by reference.

The following example illustrates the various embodiments of the present invention. Those skilled in the art will recognize many variations that are within the spirit of the present invention and scope of the claims.

EXAMPLE 1

NOCOLOK(R) flux in an aqueous suspension of $KAlF_4$+ $K_3AlF_6$ solution was sprayed onto an aluminum manifold, formed of a 3003 aluminum alloy. The aluminum manifold was subsequently brazed in a controlled atmosphere furnace. FIG. 1 depicts a scanning electron microscopy (SEM) image of a surface of the aluminum manifold after fluxing and brazing. The image shows flux powder crystals with a squared crystalline shape substantially covering the aluminum surface.

Figure 2:
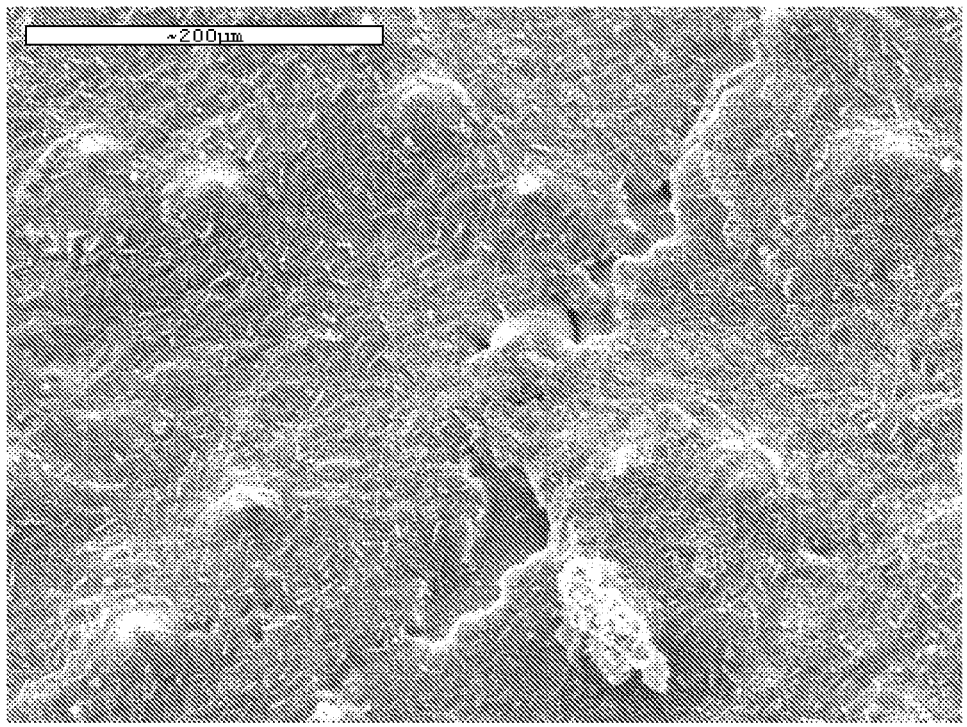
FIG. 2 depicts an SEM image of the brazed aluminum surface after KF treatment according to one embodiment of the present invention.

The brazed aluminum surface was contacted with an aqueous KF bath by immersion to remove the flux powder crystals. The concentration of the KF by weight of aqueous solution was 3.0%. FIG. 2 depicts an SEM image of the brazed aluminum surface after KF treatment. The image shows that the flux crystals have been removed from the surface. The KF treated surface is suitable to receive a subsequent coating without substantial delamination because the flux powder crystals have been removed.

Figure 3:
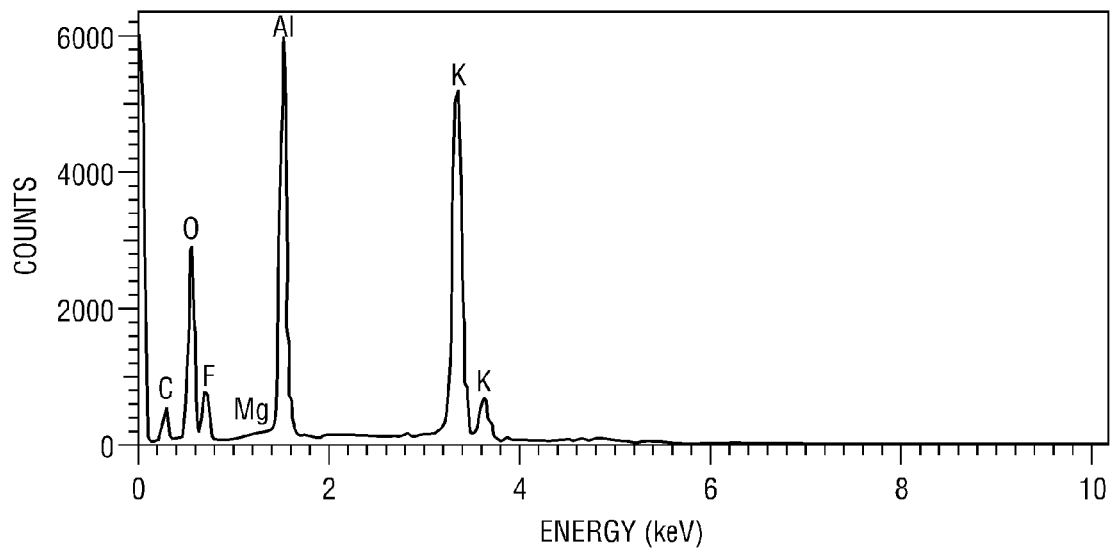
FIG. 3 depicts an energy dispersive spectroscopy (EDS) graph of the pre-KF treatment brazed aluminum surface according to one embodiment of the present invention.
Figure 4:
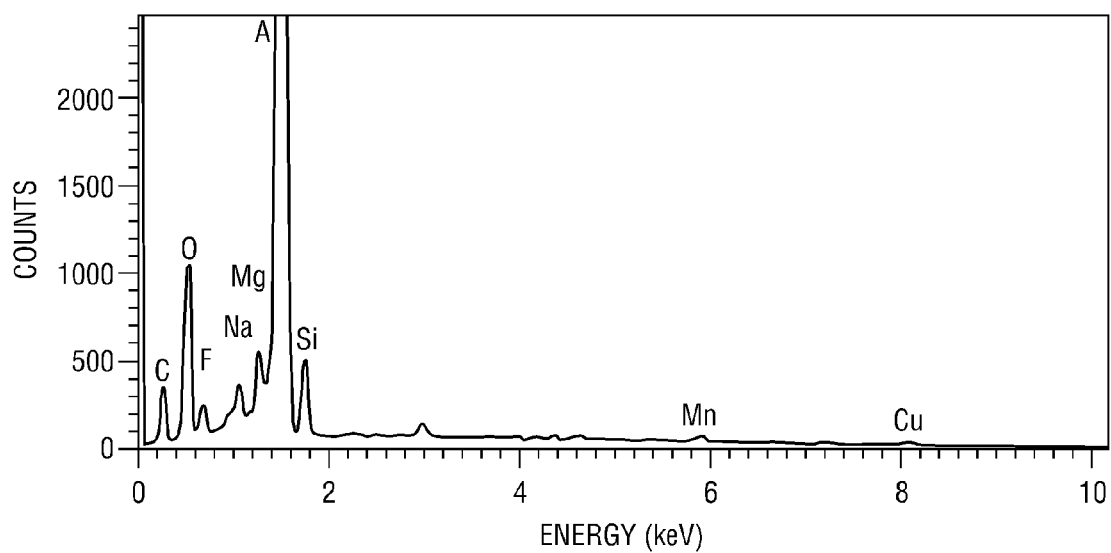
FIG. 4 depicts an EDS graph of the KF treated brazed aluminum surface according to one embodiment of the present invention.

FIG. 3 depicts an energy dispersive spectroscopy (EDS) graph of the pre-KF treatment brazed aluminum surface. FIG. 3 indicates that KAlF phase crystals, i.e. flux powder crystals, exist on the surface. FIG. 4 depicts an EDS graph of the KF treated brazed aluminum surface. FIG. 4 shows Si and Al peaks, while the K phase peaks are no longer present, thereby indicated that the KAlF phase crystals were removed by the KF treatment.

As required, detailed embodiments of the present invention are disclosed herein. However, it is to be understood that the disclosed embodiments are merely exemplary of an invention that may be embodied in various and alternative forms. While embodiments of the have been illustrated and described, it is not intended that these embodiments illustrate and describe all possible forms of the invention. Rather, the words used in the specification are words of description rather than limitation, and it is understood that various changes may be made without departing from the spirit and scope of the invention.

In accordance with the provisions of the patent statute, the principle and mode of operation of this invention have been explained and illustrated in its various embodiments. However, it must be understood that this invention may be practiced otherwise than as specifically explained and illustrated without departing from its spirit or scope.

What is claimed:

1. A method comprising:
    treating an unbrazed surface with an aqueous suspension of $KAlF_4$ and $K_3AlF_6$;
    brazing the treated, unbrazed surface to obtain a brazed surface having a flux layer including a conversion coating and a powder component; and
    applying a 2.5% to 3.5% by weight aqueous solution of KF to the brazed surface to at least partially remove the powder component to obtain a treated brazed surface.

2. The method of claim 1, wherein the concentration of KF is 3.0% by weight of the aqueous solution.

3. The method of claim 1, wherein the applying step includes immersing the brazed surface in the aqueous solution containing a flux-removing agent for a period of 30 to 180 seconds and subsequently removing the brazed surface from immersion.

4. The method of claim 1, wherein the powder component is essentially entirely removed from the brazed surface.

5. The method of claim 1, further comprising directly applying the subsequent coating layer to the treated brazed surface without any intervening steps between applying the flux-removing agent and directly applying the subsequent coating layer.

6. The method of claim 5, wherein the coating is an odor prevention coating.

7. The method of claim 5, wherein the coating is an anti-corrosion coating.

8. The method of claim 5, wherein the directly applying step includes spraying the coating onto the treated surface.

9. The method of claim 1, wherein the brazed surface is a brazed surface on a heat exchanger.

10. A method for comprising:
    applying an aqueous suspension of $KAlF_4$ and $K_3AlF_6$ to an unbrazed surface;
    brazing the unbrazed surface to obtain a brazed surface and flux layer including a conversion coating and a powder component; and
    immersing the brazed surface in an aqueous solution KF at a concentration of 2.5%-3.5% by weight of the aqueous solution for a period of 30 to 180 seconds and subsequently removing the brazed surface from immersion to at least partially remove the powder component of the flux layer and to obtain a treated brazed surface suitable for receiving a subsequent coating layer.

11. The method of claim 10, further comprising applying the subsequent coating layer to the treated brazed surface so that the coating adheres to the treated brazed surface.

12. The method of claim 10, wherein the immersion time is 60 seconds.

13. A method comprising:
    applying an aqueous suspension of $KAlF_4$ and $K_3AlF_6$ to one or more aluminum surfaces;
    brazing the one or more aluminum surfaces to obtain one or more brazed surfaces and a flux layer including a conversion coating and a powder component; and
    immersing the one or more brazed surfaces in an aqueous solution KF at a concentration of 2.5%-3.5% by weight of the aqueous solution for a period of 30 to 180 seconds and subsequently removing the one or more brazed surfaces from immersion to at least partially remove the powder component of the flux layer and to obtain one or more treated brazed surface that are suitable for receiving a subsequent coating layer.

14. The method of claim 13, further comprising applying the subsequent coating layer to the treated brazed surface so that the coating adheres to the treated brazed surface.

15. The method of claim 14, wherein the subsequent coating layer is an odor preventing coating layer.

* * * * *